USO11807223B2

(12) United States Patent
Ueki et al.

(10) Patent No.: US 11,807,223 B2
(45) Date of Patent: Nov. 7, 2023

(54) AUTOMATED DRIVE DEVICE AND AUTOMATED DRIVE METHOD

(71) Applicant: TOYOTA JIDOSHA KABUSHIKI KAISHA, Toyota (JP)

(72) Inventors: Nobukazu Ueki, Shizuoka-ken (JP); Daichi Hotta, Tokyo (JP); Sadayuki Abe, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 32 days.

(21) Appl. No.: 17/502,581

(22) Filed: Oct. 15, 2021

(65) Prior Publication Data

US 2022/0194362 A1 Jun. 23, 2022

(30) Foreign Application Priority Data

Dec. 22, 2020 (JP) ................. 2020-212795

(51) Int. Cl.
*B60W 30/06* (2006.01)
(52) U.S. Cl.
CPC ......... *B60W 30/06* (2013.01); *B60W 2300/10* (2013.01); *B60W 2540/043* (2020.02)
(58) Field of Classification Search
CPC .................. B60W 30/06; B60W 2540/043
See application file for complete search history.

(56) References Cited

U.S. PATENT DOCUMENTS

| 2018/0039917 | A1* | 2/2018 | Buttolo | B60W 60/00253 |
| 2020/0019761 | A1* | 1/2020 | Kang | G08G 1/096833 |
| 2020/0159217 | A1* | 5/2020 | Yamashita | B60W 60/00253 |
| 2020/0262453 | A1* | 8/2020 | Mimura | G06Q 50/30 |
| 2020/0310457 | A1 | 10/2020 | Hara | |
| 2020/0349666 | A1* | 11/2020 | Hodge | G08G 1/017 |

FOREIGN PATENT DOCUMENTS

| CN | 111766868 A | 10/2020 |
| JP | 2013-137606 A | 7/2013 |
| JP | 2017-185954 A | 10/2017 |
| JP | 2020-059302 A | 4/2020 |
| JP | 2020-086744 A | 6/2020 |
| JP | 2020-135234 A | 8/2020 |
| JP | 2020-160705 A | 10/2020 |
| KR | 10-2019-0106845 A | 9/2019 |

* cited by examiner

*Primary Examiner* — Jelani A Smith
*Assistant Examiner* — Nada Mahyoob Alqaderi
(74) *Attorney, Agent, or Firm* — Dinsmore & Shohl LLP

(57) ABSTRACT

An automated drive device that automatically stops a vehicle in a pick-up and drop-off area in which a passenger gets and off the vehicle includes at least one processor and at least one memory that stores a program and information to be read by the at least one processor. The processor is configured to acquire the type of the passenger before the vehicle reaches the pick-up and drop-off area as a first process. The processor is configured to change a behavior for stopping the vehicle in the pick-up and drop-off area in accordance with the type of the passenger as a second process.

13 Claims, 8 Drawing Sheets

AUTOMATED DRIVE DEVICE AND AUTOMATED DRIVE METHOD

CROSS-REFERENCE TO RELATED APPLICATION

This application claims priority to Japanese Patent Application No. 2020-212795 filed on Dec. 22, 2020, incorporated herein by reference in its entirety.

BACKGROUND

1. Technical Field

The present disclosure relates to an automated drive device and an automated drive method that automatically stop a vehicle in a pick-up and drop-off area in which a passenger gets on and off the vehicle.

2. Description of Related Art

Japanese Unexamined Patent Application Publication No. 2020-059302 (JP 2020-059302 A) discloses an example of a technique of stopping a bus in a pick-up and drop-off area through automated drive. In the technique described in JP 2020-059302 A, the clearance between curb stones along the pick-up and drop-off area and the bus is controlled when the bus is stopped in the pick-up and drop-off area.

SUMMARY

Passenger automobiles (hereinafter simply referred to as "vehicles") such as buses and taxis are used by various passengers. The feeling to be had by passengers waiting beside a pick-up and drop-off area when a vehicle is approaching the pick-up and drop-off area differs among the passengers, and particularly differs in accordance with the type of the passengers.

The present disclosure provides an automated drive device and an automated drive method that can stop a vehicle in a pick-up and drop-off area, in which passengers get on and off the vehicle, with movement that matches the feeling of the passengers.

The present disclosure pertains to an automated drive device that automatically stops a vehicle in a pick-up and drop-off area in which a passenger gets on and off the vehicle. The automated drive device includes at least one processor and at least one memory that stores a program and information to be read by the at least one processor. The at least one processor is configured to acquire a type of the passenger before the vehicle reaches the pick-up and drop-off area as a first process. The at least one processor is configured to change a behavior for stopping the vehicle in the pick-up and drop-off area in accordance with the type of the passenger as a second process. It is possible to stop the vehicle with movement that matches the feeling of the passenger by executing these processes.

In the automated drive device according to the present disclosure, the at least one processor may be configured to perform a first approaching operation to cause the vehicle to approach the pick-up and drop-off area in the second process when the type of the passenger acquired in the first process is a vulnerable pedestrian. The at least one processor may be configured to perform a second approaching operation to cause the vehicle to approach the pick-up and drop-off area in the second process when the type of the passenger acquired in the first process is not a vulnerable pedestrian. A position at which an advancing direction of the vehicle is varied in the second approaching operation may be closer to a waiting position of the passenger than a position at which the advancing direction of the vehicle is varied in the first approaching operation. The waiting position may be a position at which the passenger waits to get on and off the vehicle.

Vulnerable pedestrians have difficulty in taking prompt action. Therefore, when a vehicle is approaching the waiting position, the vulnerable pedestrians tend to feel afraid of the vehicle approaching themselves, compared to ordinary passengers. When the vehicle is an automated vehicle, in particular, the automated vehicle is not driven by a driver who can make eye contact with the passengers. Therefore, the vulnerable pedestrians at the waiting position tend to feel more afraid. By performing the first approaching operation described above, however, the vehicle varies its advancing direction at a position far from the vulnerable pedestrians, and approaches the pick-up and drop-off area. Thus, the vulnerable pedestrians feel less afraid of the vehicle approaching.

In the automated drive device according to the present disclosure, the at least one processor may be configured to perform the first approaching operation in the second process when a plurality of the passengers is waiting at the waiting position and at least one of the passengers is a vulnerable pedestrian. Consequently, the vehicle can be stopped with movement that is gentle to the vulnerable pedestrians at all times.

In the automated drive device according to the present disclosure, the at least one processor may be configured to perform a first vehicle stopping operation to stop the vehicle such that an entrance to the vehicle is aligned with a waiting position for the passenger in the second process when the type of the passenger acquired in the first process is a vulnerable pedestrian. The at least one processor may be configured to perform a second vehicle stopping operation to stop the vehicle at a position determined in advance in the pick-up and drop-off area in the second process when the type of the passenger acquired in the first process is not a vulnerable pedestrian. By varying the content of the vehicle stopping operation in accordance with the type of the passenger in this manner, it is possible to enhance the convenience to the vulnerable pedestrians. In addition, the other passengers do not feel annoyed by extra movement of the vehicle.

In the automated drive device according to the present disclosure, the at least one processor may be configured to perform the first vehicle stopping operation in the second process when a plurality of the passengers is waiting at the waiting position and at least one of the passengers is a vulnerable pedestrian. Consequently, priority can be given to the convenience to the vulnerable pedestrians.

In the automated drive device according to the present disclosure, the at least one processor may be configured to perform a first vehicle stopping operation to stop the vehicle such that an entrance to the vehicle is aligned with a waiting position for the passenger in the second process when the type of the passenger acquired in the first process is a vulnerable pedestrian or a person carrying heavy baggage. The at least one processor may be configured to perform a second vehicle stopping operation to stop the vehicle at a position determined in advance in the pick-up and drop-off area in the second process when the type of the passenger acquired in the first process is neither a vulnerable pedestrian nor a person carrying heavy baggage. By varying the content of the vehicle stopping operation in accordance with the type of the passenger in this manner, it is possible to enhance the convenience to the vulnerable pedestrians and the people carrying heavy baggage. In addition, the other passengers do not feel annoyed by extra movement of the vehicle.

In the automated drive device according to the present disclosure, the at least one processor may be configured to perform the first vehicle stopping operation in the second process when a plurality of the passengers is waiting at the waiting position and at least one of the passengers is a vulnerable pedestrian or a person carrying heavy baggage. Consequently, priority can be given to the convenience to the vulnerable pedestrians and the people carrying heavy baggage.

The present disclosure pertains to an automated drive method of automatically stopping a vehicle in a pick-up and drop-off area in which a passenger gets on and off the vehicle. The automated drive method includes: acquiring a type of the passenger before the vehicle reaches the pick-up and drop-off area as a first step; and changing a behavior for stopping the vehicle in the pick-up and drop-off area in accordance with the type of the passenger as a second step. It is possible to stop the vehicle with movement that matches the feeling of the passenger through these steps.

In the automated drive method according to the present disclosure, when the type of the passenger acquired in the first step is a vulnerable pedestrian, a first approaching operation to cause the vehicle to approach the pick-up and drop-off area may be performed in the second step. When the type of the passenger acquired in the first step is not a vulnerable pedestrian, a second approaching operation to cause the vehicle to approach the pick-up and drop-off area may be performed in the second step. A position at which an advancing direction of the vehicle is varied in the second approaching operation may be closer to a waiting position of the passenger than a position at which the advancing direction of the vehicle is varied in the first approaching operation. The waiting position may be a position at which the passenger waits to get on and off the vehicle. When a plurality of passengers is waiting around the pick-up and drop-off area, the first approaching operation may be performed in the second step if at least one of the passengers is a vulnerable pedestrian.

In the automated drive method according to the present disclosure, when the type of the passenger acquired in the first step is a vulnerable pedestrian, a first vehicle stopping operation to stop the vehicle such that an entrance to the vehicle is aligned with a waiting position for the passenger may be performing in the second step. When the type of the passenger acquired in the first step is not a vulnerable pedestrian, the second step may include performing a second vehicle stopping operation to stop the vehicle at a position determined in advance in the pick-up and drop-off area. When a plurality of passengers is waiting around the pick-up and drop-off area, the first vehicle stopping operation may be performed in the second step if at least one of the passengers is a vulnerable pedestrian.

In the automated drive method according to the present disclosure, when the type of the passenger acquired in the first step is a vulnerable pedestrian or a person carrying heavy baggage, a first vehicle stopping operation to stop the vehicle such that an entrance to the vehicle is aligned with a waiting position for the passenger may be performed in the second step. When the type of the passenger acquired in the first step is neither a vulnerable pedestrian nor a person carrying heavy baggage, a second vehicle stopping operation to stop the vehicle at a position determined in advance in the pick-up and drop-off area may be performing in the second step. When a plurality of passengers is waiting around the pick-up and drop-off area, the first vehicle stopping operation may be performed in the second step if at least one of the passengers is a vulnerable pedestrian or a person carrying heavy baggage.

With the automated drive device and the automated drive method according to the present disclosure, as has been discussed above, the vehicle can be stopped in the pick-up and drop-off area, in which the passengers get on and off the vehicle, with movement that matches the feeling of the passengers.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
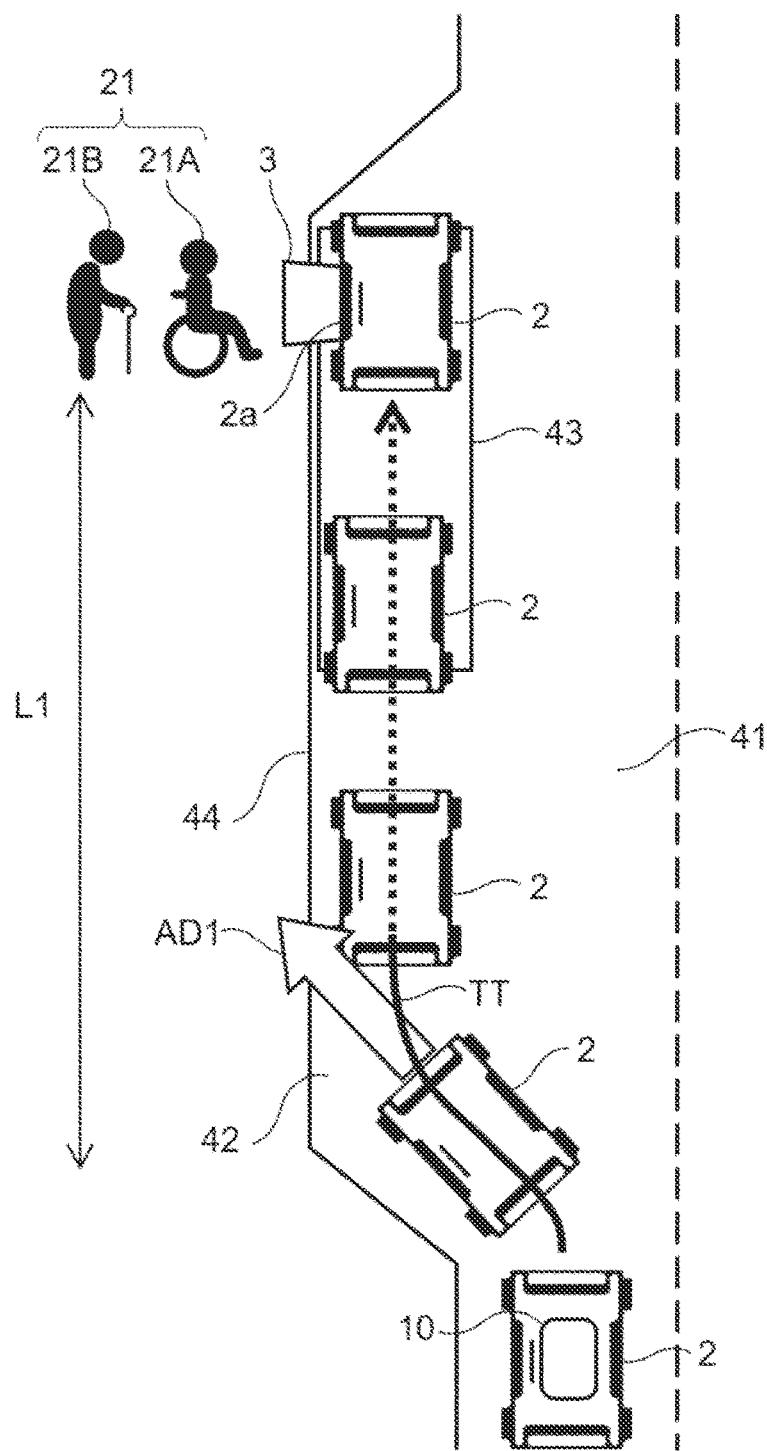
FIG. 1 illustrates an overview of an embodiment of the present disclosure, illustrating an example of the behavior of a vehicle for a case where passengers are vulnerable pedestrians.

In each embodiment described below, elements that are common to the drawings are denoted by like signs to omit or simplify redundant description. When the number, quantity, amount, range, etc. of elements are mentioned in relation to the embodiment described below, the present disclosure is not limited to such a number etc. unless specifically stated so or if it is in principle clear that the present disclosure is limited thereto. In addition, the structure etc. described in relation to the embodiment described below are not necessarily to the present disclosure unless specifically stated so or if it is in principle clear that the present disclosure is limited thereto.

1. Overview

First, an overview of the present embodiment will be described with reference to FIGS. 1 to 6.

FIGS. 1 to 6 each illustrate an example of the behavior of a bus vehicle 2 on which an automated drive device 10 according to the present embodiment is mounted. Hereinafter, the bus vehicle 2 is simply referred to as a "vehicle 2". A bus bay 42 is provided on the outer side of a travel lane 41 in which the vehicle 2 travels. A pick-up and drop-off area 43 in which the vehicle 2 is permitted to stop is defined by a rectangular frame in the bus bay 42. In principle, the vehicle 2 is allowed to stop only in the pick-up and drop-off area 43.

The vehicle 2 is an automated vehicle that can travel autonomously. The vehicle 2 travels along a target track TT generated based on a target route while sensing a forward area in the advancing direction using an external sensor to be discussed later. The target track TT is a track to be traveled by the vehicle 2 in the target route. When an obstruction is detected ahead of the vehicle 2 by sensing, the target track TT is generated such that the vehicle 2 avoids the obstruction. In the examples illustrated in the drawings, the target track TT is generated such that the vehicle 2 travels from the travel lane 41 to the bus bay 42 and the vehicle 2 is stopped in the pick-up and drop-off area 43.

The behavior of the vehicle 2 before being stopped in the pick-up and drop-off area 43 differs in accordance with the type of passengers waiting beside the pick-up and drop-off area 43. The area beside the pick-up and drop-off area 43 and in which the passengers wait is defined as a "waiting area". The types of the passengers to be determined in the present embodiment include vulnerable pedestrians, people carrying heavy baggage, and the others. Herein, the "vulnerable pedestrians" are defined as people who move at a low speed and have difficulty in moving quickly in urgent situations, such as elderly people, wheelchair users, internally handicapped people, expectant mothers, people suffering from intractable diseases, small children, parents pushing baby buggies, and parents holding babies.

Figure 2:
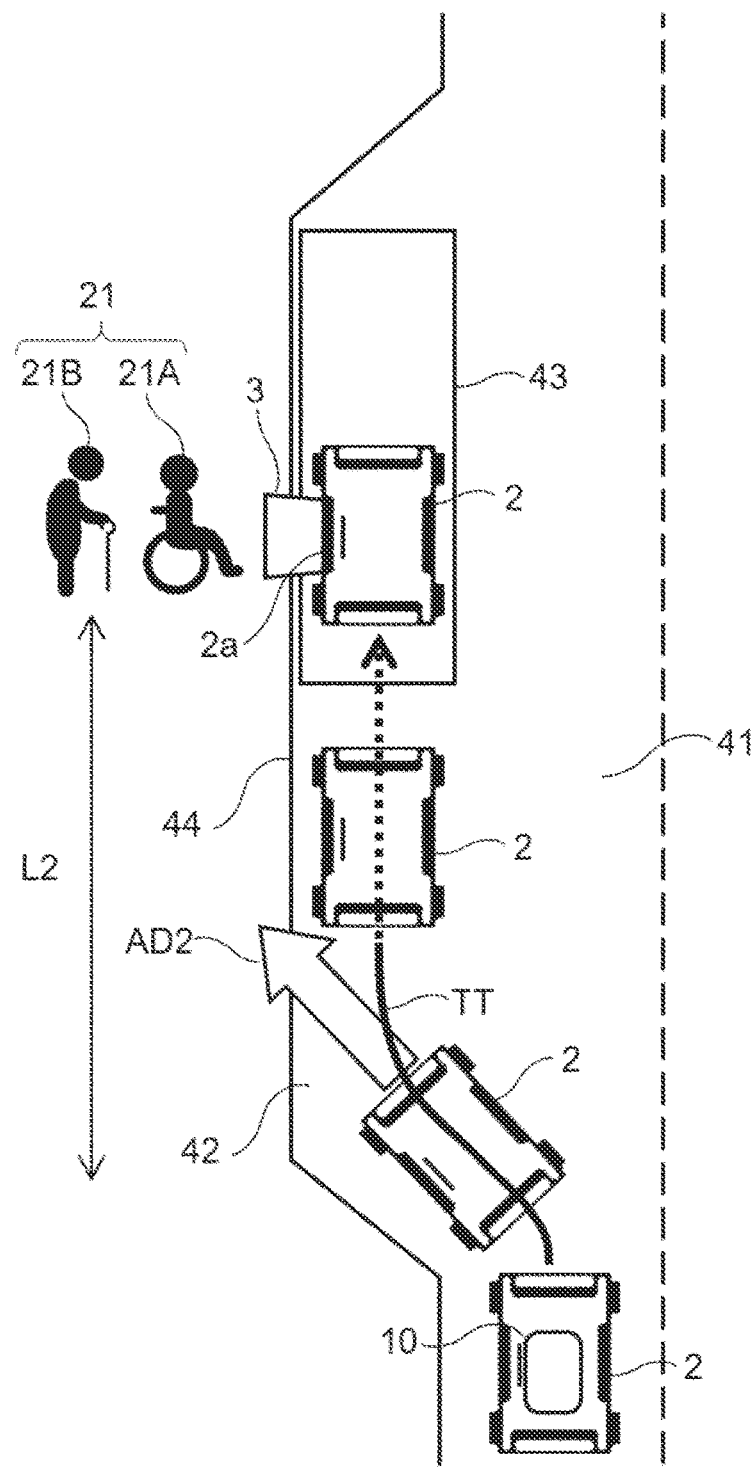
FIG. 2 illustrates an overview of the embodiment of the present disclosure, illustrating another example of the behavior of the vehicle for a case where passengers are vulnerable pedestrians.

First, the behavior of the vehicle 2 for a case where the type of the passengers is vulnerable pedestrians will be described with reference to FIGS. 1 and 2. Passengers 21 in the examples illustrated in FIGS. 1 and 2 are vulnerable pedestrians. Examples of the vulnerable pedestrians include a wheelchair user 21A and an elderly person 21B schematically illustrated in FIGS. 1 and 2.

In the example illustrated in FIG. 1, the passengers 21 are waiting at the front end portion of the waiting area. The front end portion is the front end in the advancing direction of the vehicle 2. When the vulnerable pedestrians are waiting, the vehicle 2 traveling in the travel lane 41 obliquely enters from the travel lane 41 into the bus bay 42 at the position of the bus bay 42 farthest from the pick-up and drop-off area 43. The vehicle 2 varies its advancing direction when the vehicle 2 approaches curb stones 44 that define the boundary between a sidewalk and a roadway. Then, the vehicle 2 advances at the lowest possible speed in the bus bay 42 in parallel with the curb stones 44. The vehicle 2 may be temporarily stopped at the rear end portion of the pick-up and drop-off area 43, and be advanced at the lowest possible speed after checking the safety of the area ahead. Sections indicated by the dashed line, of the line that indicates the target track TT in the drawings, indicate that the vehicle 2 advances at the lowest possible speed.

When the vulnerable pedestrians are waiting, the vehicle 2 advances to the waiting position at which the passengers 21 are waiting. Then, the vehicle 2 is stopped with an entrance 2a aligned with the waiting position for the passengers 21. After the vehicle 2 is stopped, a ramp plate 3 is automatically deployed to assist the passengers 21 to get on the vehicle 2. Further, the ground clearance of the vehicle 2 is lowered to make it easy for the passengers 21 to get on the vehicle 2.

In FIG. 1, a distance L1 from the waiting position for the passengers 21 to an entry position at which the vehicle 2 varies its advancing direction and enters from the travel lane 41 into the bus bay 42 is indicated by the double-headed arrow. In the example illustrated in FIG. 1, the entry position for the vehicle 2 is significantly far from the waiting position for the passengers 21. Therefore, an advancing direction AD1 of the vehicle 2 at the time when the vehicle 2 varies its advancing direction and enters the bus bay 42 is significantly different from the direction of the waiting position for the passengers 21 as seen from the vehicle 2.

In the example illustrated in FIG. 2, the passengers 21 are waiting around the middle portion of the waiting area. Similarly to the example illustrated in FIG. 1, the vehicle 2 obliquely enters from the travel lane 41 into the bus bay 42 at the position of the bus bay 42 farthest from the pick-up and drop-off area 43. Similarly to the example illustrated in FIG. 1, the vehicle 2 varies its advancing direction when the vehicle 2 approaches the curb stones 44 that define the boundary between the sidewalk and the roadway. Then, the vehicle 2 advances at the lowest possible speed in the bus bay 42 in parallel with the curb stones 44, and is stopped with the entrance 2a aligned with the waiting position at which the passengers 21 are waiting. After the vehicle 2 is stopped, the ramp plate 3 is automatically deployed from the vehicle 2, and the ground clearance of the vehicle 2 is lowered.

In the example illustrated in FIG. 2, the waiting position for the passengers 21 is on the rear end side of the waiting area with respect to the waiting position in the example illustrated in FIG. 1. Therefore, a distance L2 from the waiting position for the passengers 21 to the entry position for the vehicle 2 is shorter than the distance L1 in the example illustrated in FIG. 1. Since the waiting position and the entry position are significantly far enough from each other, however, an advancing direction AD2 of the vehicle 2 at the time when the vehicle 2 varies its advancing direction and enters the bus bay 42 is significantly different from the direction of the waiting position for the passengers 21 as seen from the vehicle 2.

Figure 3:
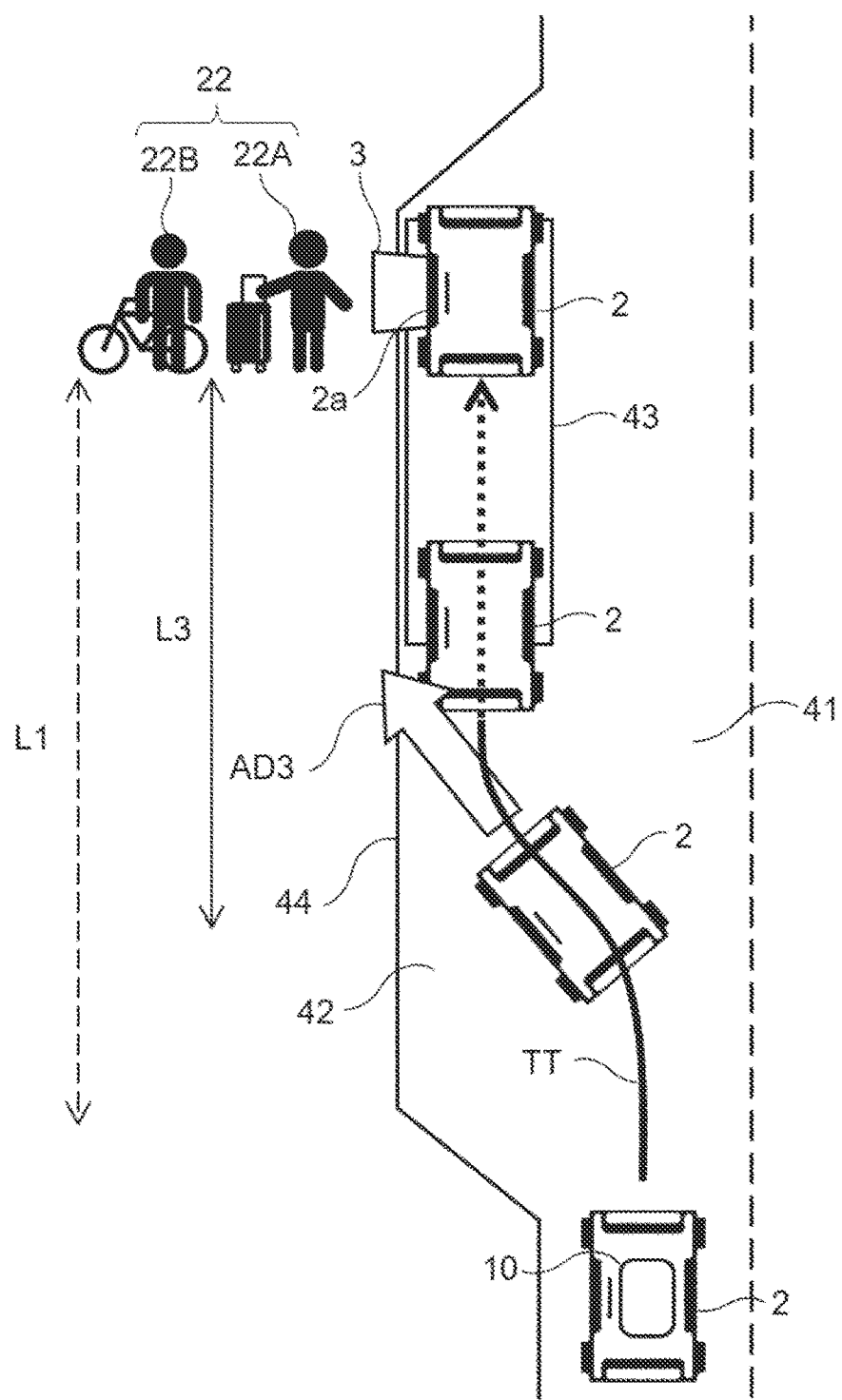
FIG. 3 illustrates an overview of the embodiment of the present disclosure, illustrating an example of the behavior of the vehicle for a case where the passengers are people carrying heavy baggage.
Figure 4:
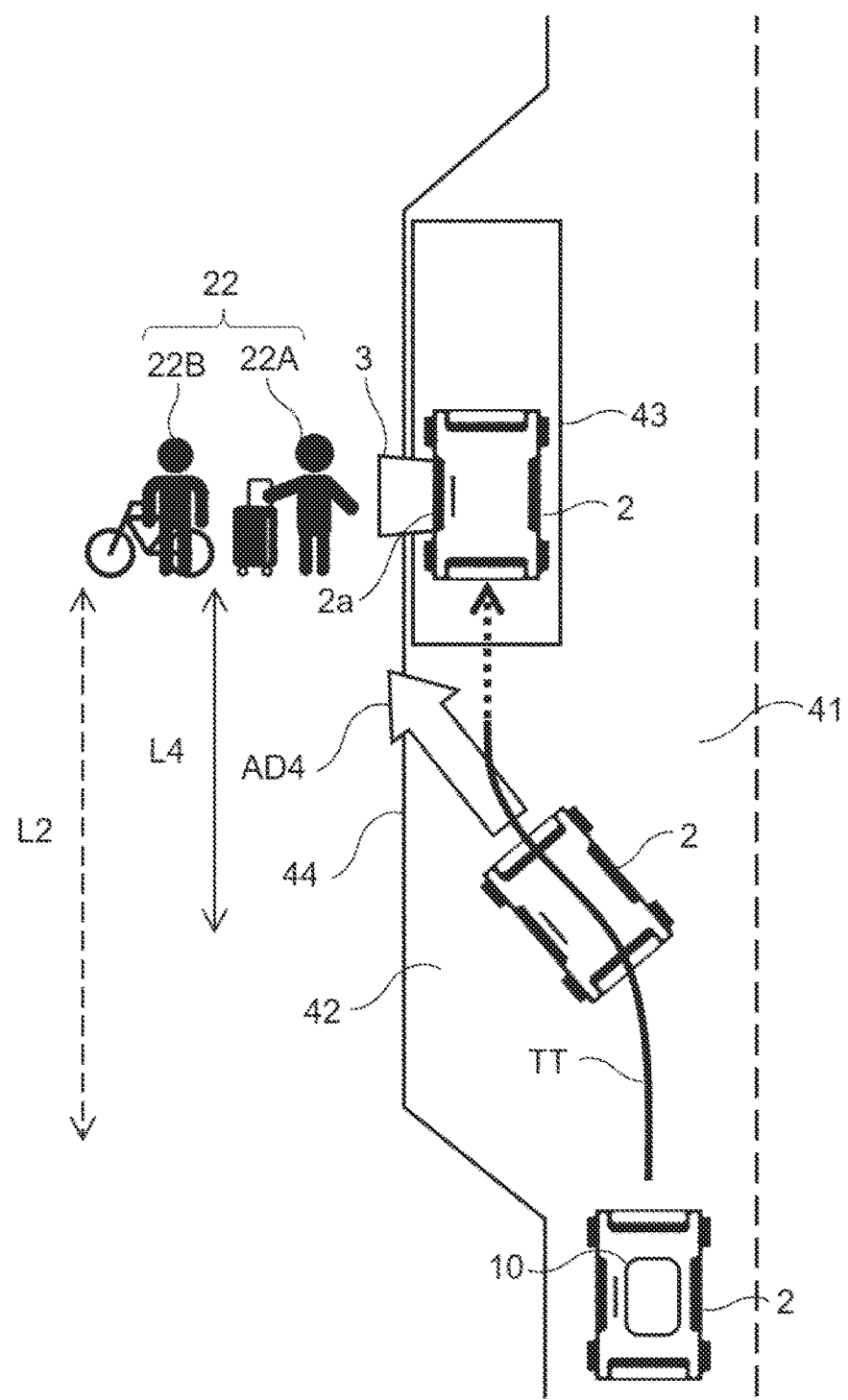
FIG. 4 illustrates an overview of the embodiment of the present disclosure, illustrating another example of the behavior of the vehicle for a case where the passengers are people carrying heavy baggage.

Next, the behavior of the vehicle 2 for a case where the type of the passengers is people carrying heavy baggage will be described with reference to FIGS. 3 and 4. Passengers 22 in the examples illustrated in FIGS. 3 and 4 are people carrying heavy baggage. Examples of the people carrying heavy baggage include a tourist 22A carrying a large suitcase and a cyclist 22B carrying a bicycle schematically illustrated in FIGS. 3 and 4.

In the example illustrated in FIG. 3, similarly to the example illustrated in FIG. 1, the passengers 22 are waiting at the front end portion of the waiting area. When the people carrying heavy baggage are waiting, the vehicle 2 traveling in the travel lane 41 obliquely enters from the travel lane 41 into the bus bay 42 before the pick-up and drop-off area 43. The vehicle 2 varies its advancing direction when the vehicle 2 approaches the curb stones 44. Then, the vehicle 2 becomes parallel to the curb stones 44 at the rear end portion of the pick-up and drop-off area 43. When the people carrying heavy baggage are waiting, the vehicle 2 advances at the lowest possible speed in parallel with the curb stones 44, and is stopped with the entrance 2a aligned with the waiting position at which the passengers 22 are waiting. After the vehicle 2 is stopped, the ramp plate 3 is automatically deployed from the vehicle 2, and the ground clearance of the vehicle 2 is lowered.

In the example illustrated in FIG. 3, the entry position at which the vehicle 2 varies its advancing direction and enters from the travel lane 41 into the bus bay 42 is closer to the pick-up and drop-off area 43 than the entry position in the example illustrated in FIG. 1. Therefore, a distance L3 from the waiting position for the passengers 22 to the entry position for the vehicle 2 is shorter than the distance L1 in the example illustrated in FIG. 1. Hence, the difference between an advancing direction AD3 at the time when the vehicle 2 varies its advancing direction and enters the bus bay 42 and the direction of the waiting position for the passengers 22 as seen from the vehicle 2 is smaller than the difference in the example illustrated in FIG. 1.

In the example illustrated in FIG. 4, similarly to the example illustrated in FIG. 2, the passengers 22 are waiting around the middle portion of the waiting area. Since the passengers 22 are people carrying heavy baggage, the vehicle 2 obliquely enters from the travel lane 41 into the bus bay 42 before the pick-up and drop-off area 43, as in the example illustrated in FIG. 3. As in the example illustrated in FIG. 3, the vehicle 2 advances at the lowest possible speed in parallel with the curb stones 44 from around the rear end portion of the pick-up and drop-off area 43. Then, the vehicle 2 is stopped with the entrance 2a aligned with the waiting position at which the passengers 22 are waiting. After the vehicle 2 is stopped, the ramp plate 3 is automatically deployed from the vehicle 2, and the ground clearance of the vehicle 2 is lowered.

In the example illustrated in FIG. 4, the entry position at which the vehicle 2 varies its advancing direction and enters from the travel lane 41 into the bus bay 42 is closer to the pick-up and drop-off area 43 than the entry position in the example illustrated in FIG. 2. Therefore, a distance L4 from the waiting position for the passengers 22 to the entry position of the vehicle 2 is much shorter than the distance L2 in the example illustrated in FIG. 2. Hence, the difference between an advancing direction AD4 at the time when the vehicle 2 varies its advancing direction and enters the bus bay 42 and the direction of the waiting position for the passengers 22 as seen from the vehicle 2 is smaller than the difference in the example illustrated in FIG. 2. In the example illustrated in FIG. 4, the waiting position for the passengers 22 is positioned ahead in the advancing direction AD4 of the vehicle 2.

Next, the behavior of the vehicle 2 for a case where the type of the passengers is neither vulnerable pedestrians nor people carrying heavy baggage will be described with reference to FIGS. 5 and 6. Herein, people that are neither vulnerable pedestrians nor people carrying heavy baggage are conveniently referred to "ordinary passengers". Passengers 23 in the examples illustrated in FIGS. 5 and 6 are ordinary passengers 23A and 23B.

Figure 5:
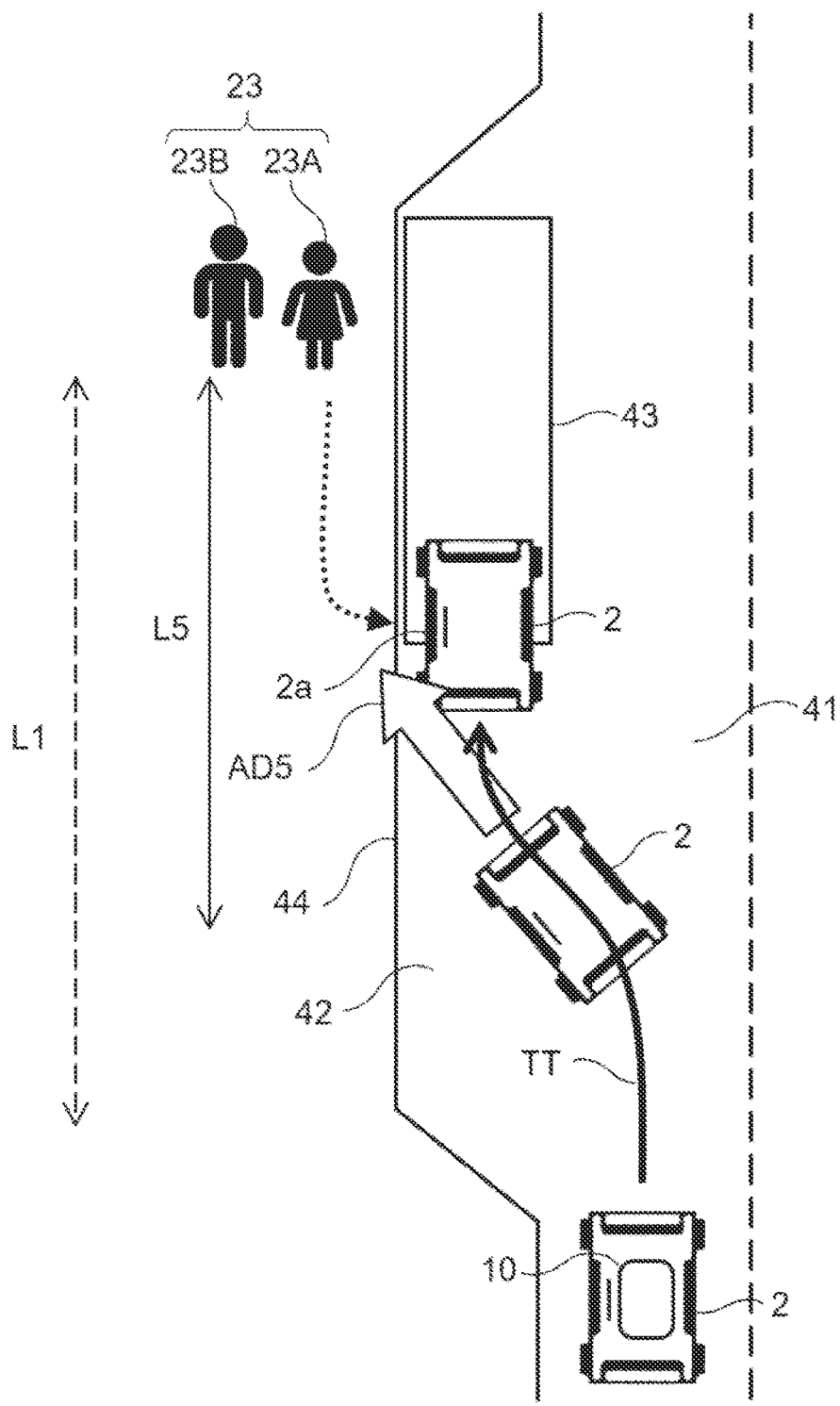
FIG. 5 illustrates an overview of the embodiment of the present disclosure, illustrating an example of the behavior of the vehicle for a case where the passengers are neither vulnerable pedestrians nor people carrying heavy baggage.

In the example illustrated in FIG. 5, as in the examples illustrated in FIGS. 1 and 3, the passengers 23 are waiting at the front end portion of the waiting area. When the ordinary passengers are waiting, the vehicle 2 traveling in the travel lane 41 obliquely enters from the travel lane 41 into the bus bay 42 before the pick-up and drop-off area 43, as in the example illustrated in FIG. 3. When the people waiting are the ordinary passengers, the vehicle 2 varies its advancing direction when the vehicle 2 approaches the curb stones 44, and is stopped at the rear end portion of the pick-up and drop-off area 43. After the vehicle 2 is stopped, the ground clearance of the vehicle 2 is lowered, but the ramp plate 3 is not deployed.

A distance L5 from the waiting position for the passengers 23 to the entry position for the vehicle 2 in the example illustrated in FIG. 5 is the same as the distance L3 in the example illustrated in FIG. 3. That is, the distance L5 is shorter than the distance L1 in the example illustrated in FIG. 1. Hence, the difference between an advancing direction AD5 at the time when the vehicle 2 varies its advancing direction and enters the bus bay 42 and the direction of the waiting position for the passengers 23 as seen from the vehicle 2 is smaller than the difference in the example illustrated in FIG. 1. That is, the advancing direction AD5 of the vehicle 2 in the example illustrated in FIG. 5 is closer to the direction of the waiting position for the passengers 23 than that in the example illustrated in FIG. 1.

Figure 6:
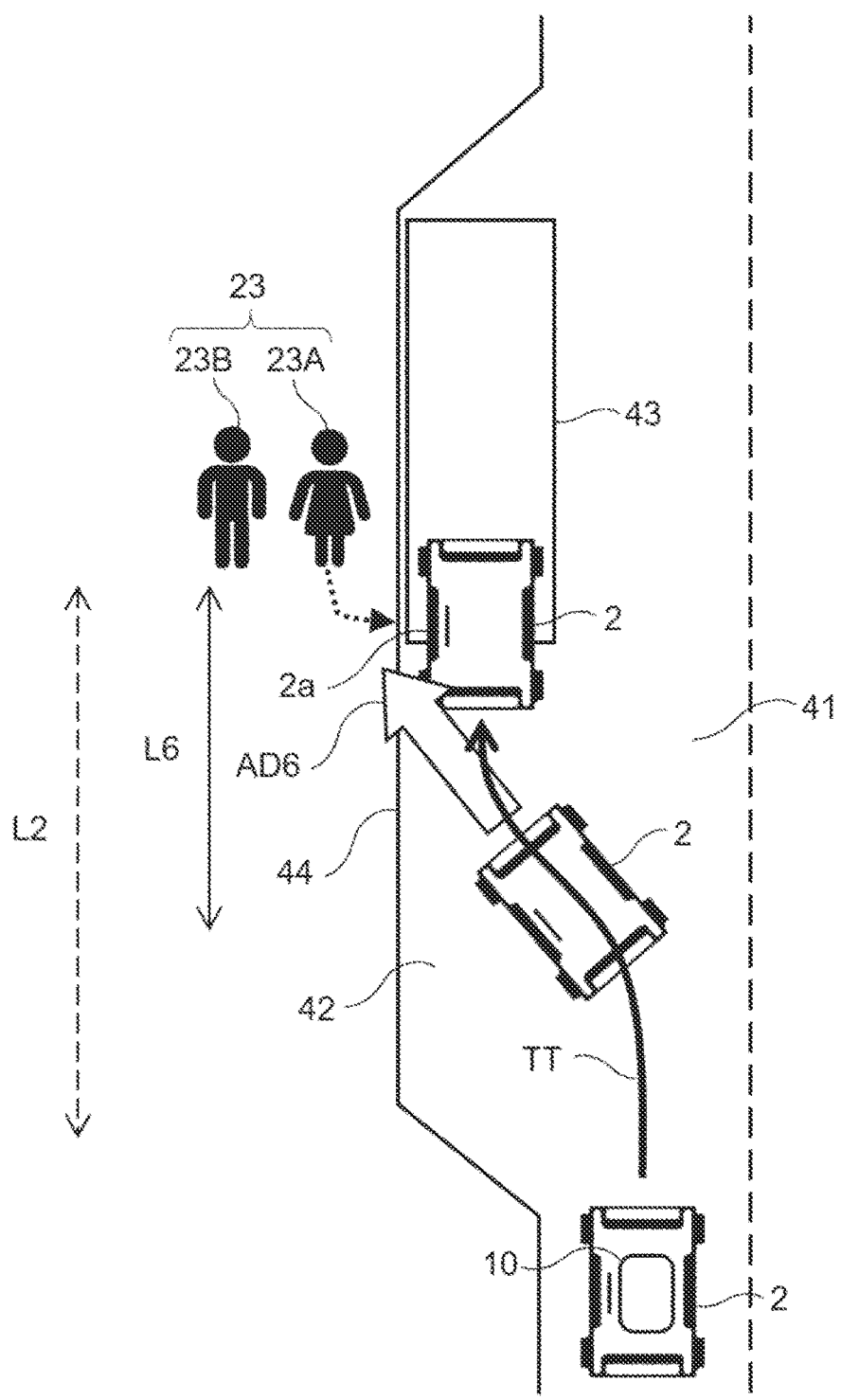
FIG. 6 illustrates an overview of the embodiment of the present disclosure, illustrating another example of the behavior of the vehicle for a case where the passengers are neither vulnerable pedestrians nor people carrying heavy baggage.

In the example illustrated in FIG. 6, similarly to the examples illustrated in FIGS. 2 and 4, the passengers 23 are waiting around the middle portion of the waiting area. Since the passengers 23 are ordinary passengers, the vehicle 2 obliquely enters from the travel lane 41 into the bus bay 42 before the pick-up and drop-off area 43, as in the example illustrated in FIG. 5. Similarly to the example illustrated in FIG. 5, the vehicle 2 varies its advancing direction when the vehicle 2 approaches the curb stones 44. Then, the vehicle 2 is stopped at the rear end portion of the pick-up and drop-off area 43. After the vehicle 2 is stopped, the ground clearance of the vehicle 2 is lowered, but the ramp plate 3 is not deployed.

A distance L6 from the waiting position for the passengers 23 to the entry position for the vehicle 2 in the example illustrated in FIG. 6 is the same as the distance L4 in the example illustrated in FIG. 4. That is, the distance L6 is shorter than the distance L2 in the example illustrated in FIG. 2. Hence, the difference between an advancing direction AD6 at the time when the vehicle 2 varies its advancing direction and enters the bus bay 42 and the direction of the waiting position for the passengers 23 as seen from the vehicle 2 is the same as the difference in the example illustrated in FIG. 4, and smaller than the difference in the example illustrated in FIG. 2. That is, in the example illustrated in FIG. 6, the waiting position for the passengers 23 is positioned ahead in the advancing direction AD6 of the vehicle 2.

In the present embodiment, as has been described in relation to the above examples, different operations are performed on the vehicle 2 in accordance with the type of the passengers. One of the different operations is an operation to cause the vehicle 2 to enter from the travel lane 41 into the bus bay 42. For the passengers 22, 23 who are not the vulnerable pedestrians, as in the examples illustrated in FIGS. 3 to 6, an approaching operation to cause the vehicle 2 to enter the bus bay 42 before the pick-up and drop-off area 43 and approach the pick-up and drop-off area 43 is performed. For the passengers 21 who are the vulnerable pedestrians, on the contrary, an approaching operation to cause the vehicle 2 to enter the bus bay 42 at the position of the bus bay 42 farthest from the pick-up and drop-off area 43 and approach the pick-up and drop-off area 43 is performed, as in the examples illustrated in FIGS. 1 and 2. That is, for the passengers 21 who are the vulnerable pedestrians, an approaching operation to cause the vehicle 2 to approach the pick-up and drop-off area 43 is performed at a position farther from the waiting position than for the passengers 22, 23 who are not the vulnerable pedestrians.

Specifically, for the passengers 22, 23 who are not the vulnerable pedestrians, the waiting position for the passengers 22, 23 is occasionally positioned ahead in the advancing direction AD4, AD6 of the vehicle 2, as in the examples illustrated in FIGS. 4 and 6, depending on the waiting position for the passengers 22, 23. In this case, the passengers 22, 23 who are located at the waiting position see the vehicle 2 approaching towards themselves. The vulnerable pedestrians have difficulty in taking prompt action. Therefore, when the passengers 22, 23 are the vulnerable pedestrians, the passengers 22, 23 tend to feel afraid of the vehicle 2 approaching towards themselves. Further, the vehicle 2 according to the present embodiment is an automated vehicle, and thus people cannot make eye contact with a driver. Hence, the vulnerable pedestrians would feel more afraid.

By performing an approaching operation as in the examples illustrated in FIGS. 1 and 2, however, the vehicle 2 varies its advancing direction at a position far from the passengers 21 who are the vulnerable pedestrians, and approaches the pick-up and drop-off area 43. Thus, the possibility that the waiting position for the passengers 21 is positioned ahead in the advancing direction AD1, AD2 of the vehicle 2 is suppressed. Consequently, the passengers 21 who are the vulnerable pedestrians feel less afraid of the vehicle 2 approaching. The approaching operation discussed above performed for the passengers 21 who are the vulnerable pedestrians is an example of a "first approaching operation". The approaching operation performed for the passengers 22, 23 who are not the vulnerable pedestrians is an example of a "second approaching operation". The first approaching operation is an approaching operation to cause the vehicle 2 to approach the pick-up and drop-off area 43 at a position farther from the waiting position for the passengers than the second approaching operation.

Another one of the different operations performed on the vehicle 2 in accordance with the type of the passengers is an operation to stop the vehicle 2 in the pick-up and drop-off area 43. For the passengers 21 who are the vulnerable pedestrians and the passengers 22 who carry heavy baggage, an operation to stop the vehicle 2 with the entrance 2a to the vehicle 2 aligned with the waiting position for the passengers 21, 22 is performed, as in the examples illustrated in FIGS. 1 to 4. This operation is an example of a "first vehicle stopping operation". When the first vehicle stopping operation is performed, the passengers 21, 22 can wait at any position around the pick-up and drop-off area 43. After the vehicle 2 is stopped, in addition, an operation to deploy the ramp plate 3 is also performed, which makes it easy for the passengers 21, 22 to get on the vehicle 2.

For the ordinary passengers 23, on the other hand, as in the examples illustrated in FIGS. 5 and 6, an operation to stop the vehicle 2 at a position determined in advance in the pick-up and drop-off area 43, at the rear end portion of the pick-up and drop-off area 43 in these examples, is performed. This operation is an example of a "second vehicle stopping operation". Due to the second vehicle stopping operation, the vehicle 2 is stopped at a predetermined position. Therefore, the possibility that the ordinary passengers 23, who can walk freely by themselves without difficulty, feel annoyed at extra movement of the vehicle 2 can be suppressed. In addition, the ramp plate 3 is not deployed for the ordinary passengers 23. Therefore, the possibility that the passengers 23 feel annoyed at the time required for deployment of the ramp plate 3 can also be suppressed.

2. Configuration of Automated Drive Device

Figure 7:
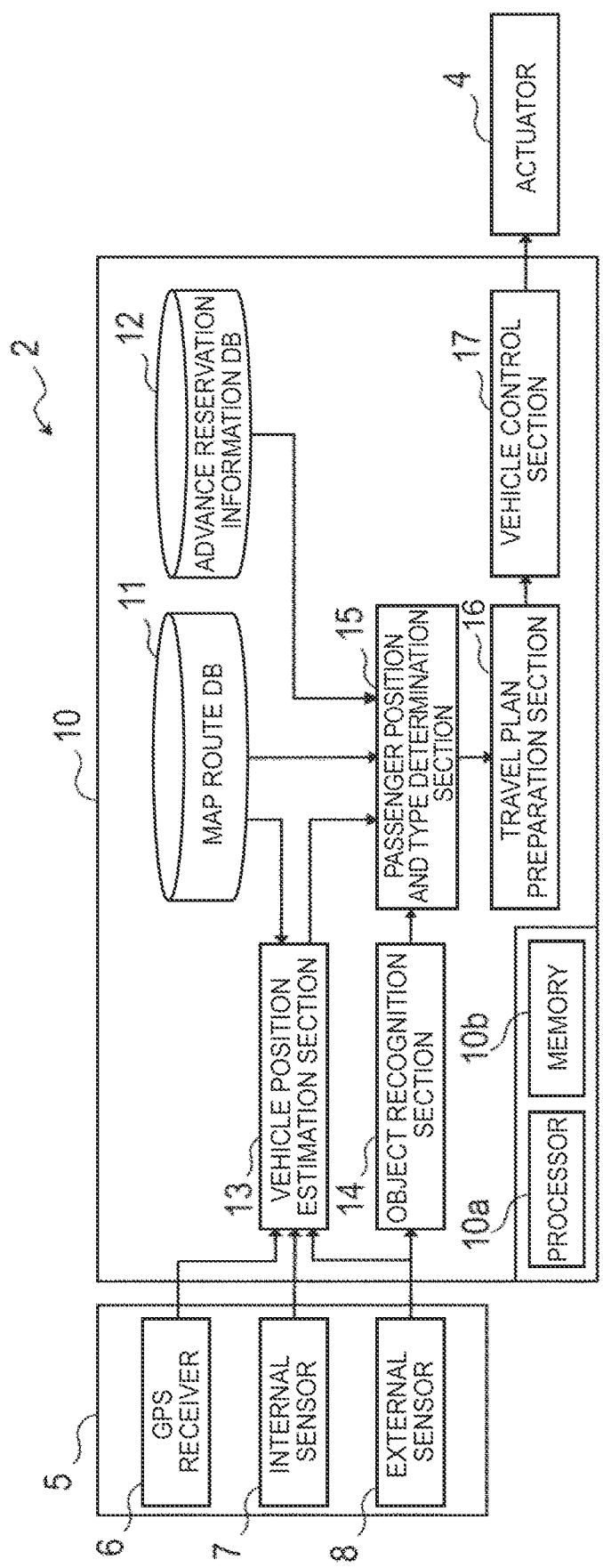
FIG. 7 is a block diagram illustrating the configuration of a vehicle to which an automated drive device according to the embodiment of the present disclosure is applied.

The behavior of the vehicle 2 described in the above overview is implemented by the following configuration of the automated drive device 10. FIG. 7 is a block diagram illustrating the configuration of the vehicle (automated vehicle) 2 to which the automated drive device 10 is applied. The vehicle 2 includes the automated drive device 10, an in-vehicle sensor 5 that inputs information to the automated drive device 10, and an actuator 4 that operates in accordance with a signal output from the automated drive device 10.

The in-vehicle sensor 5 includes a global positioning system (GPS) receiver 6, an internal sensor 7, and an external sensor 8. The GPS receiver 6 receives signals from GPS satellites to measure the present position (e.g. latitude and longitude) of the vehicle 2. The internal sensor 7 is a sensor that acquires information related to motion of the vehicle 2. The internal sensor 7 includes a wheel speed sensor, an acceleration sensor, a yaw rate sensor, and a steering angle sensor, for example. The external sensor 8 is a sensor that acquires information related to the surrounding environment of the vehicle 2. The external sensor 8 includes a camera, a millimeter wave radar, and a light detection and ranging (LiDAR) sensor. Information obtained by the external sensor 8 is used for processes to detect an object that is present around the vehicle 2, measure the position or the speed of the detected object relative to the vehicle 2, recognize the shape of the detected object, etc. Besides the above components, the vehicle 2 also includes a communication device that receives information provided by an external server through a wireless communication network.

The actuator includes an actuator related to travel of the vehicle 2, an air suspension system, and an actuator that moves the ramp plate 3 into and out of the vehicle body. The actuator related to travel specifically includes a steering actuator that steers the vehicle 2, a drive actuator that drives the vehicle 2, and a braking actuator that brakes the vehicle 2. The air suspension system includes suspensions with actuators that are expandable by letting air in and out. The air suspension system is provided for the purpose of improving the ride comfort of the vehicle 2 during travel and adjusting the ground clearance of the vehicle 2.

The automated drive device 10 is an electronic control unit (ECU) that has at least one processor 10a and at least one memory 10b. The memory 10b includes a main storage device and an auxiliary storage device. The memory 10b stores a program that is executable by the processor 10a and a variety of information associated with the program. The program includes a program for causing the vehicle 2 to take the behavior described in relation to the overview discussed earlier. The automated drive device 10 implements various functions by the processor 10a executing the program stored in the memory 10b. The ECU that constitutes the automated drive device 10 may be a collection of a plurality of ECUs.

The information stored in the memory 10b includes map information. The map information is managed by a map route database (map route DB) 11. The map information managed by the map route DB 11 includes road position information, road shape information, information on branch points at intersections, information on the target route to be traveled by the vehicle (e.g. information obtained by connecting points arranged at the center of the lane to be traveled), and road structure information. The road structure information includes information on stationary objects that can be acquired by the external sensor 8 such as the curb stones 44. The map route DB 11 is stored in advance in the auxiliary storage device such as a solid state drive (SSD) and a hard disk drive (HDD). However, map information may be downloaded from a server via the Internet, or map information on a server may be referenced.

The information stored in the memory 10b includes information on advance reservations for the passengers. The advance reservation information is managed by an advance reservation information database (advance reservation information DB) 12. The advance reservation information is information registered when the passengers make a reservation for a ride using a smartphone application. Items to be registered to make a reservation using the application include an item to confirm whether the expected passenger is a vulnerable pedestrian or carries heavy baggage. Hence, the advance reservation information includes information related to the type of the passengers. Processes pertaining to reservations are performed by a reservation server in a reservation center. The reservation server transmits the advance reservation information to the vehicle 2, for which reservations are made.

The automated drive device 10 includes a vehicle position estimation section 13, an object recognition section 14, a passenger position and type determination section 15, a travel plan preparation section 16, and a vehicle control section 17 as components related to vehicle control for stopping the vehicle 2 in the pick-up and drop-off area 43. These components are implemented as the functions of the automated drive device 10 when the program stored in the memory 10b is executed by the processor 10a.

The vehicle position estimation section 13 estimates the position of the vehicle 2 on a map based on position information on the vehicle 2 received by the GPS receiver 6, information related to the travel state of the vehicle 2 detected by the internal sensor 7, and map information obtained from the map route DB 11. The information related to the travel state includes vehicle speed information, acceleration information, yaw rate information, etc., for example. In addition, the vehicle position estimation section 13 can estimate the position of the vehicle 2 from the position of a characteristic object detected by the external sensor 8 relative to the vehicle 2, information related to the travel state of the vehicle 2 detected by the internal sensor 7, and the position of the detected characteristic object on a map.

The object recognition section 14 recognizes an object around the vehicle 2 by applying a technique, such as pattern matching and deep learning, to information received from the external sensor 8 to specify the position at which the object is present and the type of the object. Examples of the object to be recognized by the object recognition section 14 include a vehicle, a motorcycle, a bicycle, a pedestrian, etc. The passengers waiting in the waiting area are each also an object to be recognized by the object recognition section 14. When the passengers have a characteristic appearance, the type of the passengers can be determined from the appearance. For example, a wheelchair user, an elderly person with a stick, a parent and a child with a baby buggy, etc. can be determined as the type of the passengers through pattern matching, for example. The object recognition section 14 outputs the object, the position and the type of which have been specified, as a target.

The passenger position and type determination section 15 acquires the map information from the map route DB 11, the advance reservation information from the advance reservation information DB 12, the vehicle position information from the vehicle position estimation section 13, and the target information from the object recognition section 14. The passenger position and type determination section 15 determines the waiting position for the passengers waiting in the waiting area and the type of the passengers based on the acquired information. The passenger position and type determination section 15 determines whether the passengers waiting include a vulnerable pedestrian and whether the passengers include a person carrying heavy baggage. The passenger position and type determination section 15 executes such determinations before the vehicle 2 reaches the pick-up and drop-off area 43, more particularly before the vehicle 2 starts the behavior of approaching the pick-up and drop-off area 43.

The travel plan preparation section 16 prepares a travel plan for the vehicle 2 based on the target route recorded in the map route DB 11, the target information obtained by the object recognition section 14, and the waiting position and the type of the passengers determined by the passenger position and type determination section 15, for example. The travel plan is prepared such that the vehicle 2 travels on the target route appropriately in the light of safety, compliance, and standards such as travel efficiency. The travel plan preparation section 16 generates a target track TT based on the prepared travel plan. The target track TT includes a collection of target positions p for the vehicle 2 in a coordinate system fixed to the vehicle 2, and a target speed v at each target point. That is, the travel plan preparation section 16 outputs the target track TT as a collection of configuration coordinates (p, v).

The target track TT to the pick-up and drop-off area 43 differs in accordance with the waiting position and the type of the passengers. When the type of the passengers determined by the passenger position and type determination section 15 is the vulnerable pedestrians, a target track TT such as those in the examples illustrated in FIGS. 1 and 2 is generated. The operations to cause the behavior of the vehicle 2 to follow the target track TT are the first approaching operation and the first vehicle stopping operation discussed earlier. When the determined type of the passengers is the people carrying heavy baggage, a target track TT such as those in the examples illustrated in FIGS. 3 and 4 is generated. The second approaching operation and the first vehicle stopping operation discussed earlier are performed to cause the behavior of the vehicle 2 to follow the target track TT. When the determined type of the passengers is the ordinary passengers, a target track TT such as those in the examples illustrated in FIGS. 5 and 6 is generated. The second approaching operation and the second vehicle stopping operation discussed earlier are performed to cause the behavior of the vehicle 2 to follow the target track TT.

The vehicle control section 17 automatically controls travel of the vehicle 2 based on the target track TT generated by the travel plan preparation section 16. The vehicle control section 17 outputs an operation signal for causing the vehicle 2 to follow the target track TT to travel actuators. In addition, the vehicle control section 17 lowers the ground clearance of the vehicle 2 by controlling the actuators of the air suspension system when the vehicle 2 is stopped. When the type of the passengers is the vulnerable pedestrians or the people carrying heavy baggage, further, the vehicle control section 17 deploys the ramp plate 3 from the vehicle body when the vehicle 2 is stopped.

In the automated drive device 10 configured as described above, the process performed by the passenger position and type determination section 15 is an example of the first process of the automated drive device according to the present disclosure. Meanwhile, the process performed by the travel plan preparation section 16 and the vehicle control section 17 is an example of the second process of the automated drive device according to the present disclosure.

3. Automated Drive Method with Automated Drive Device

Figure 8:
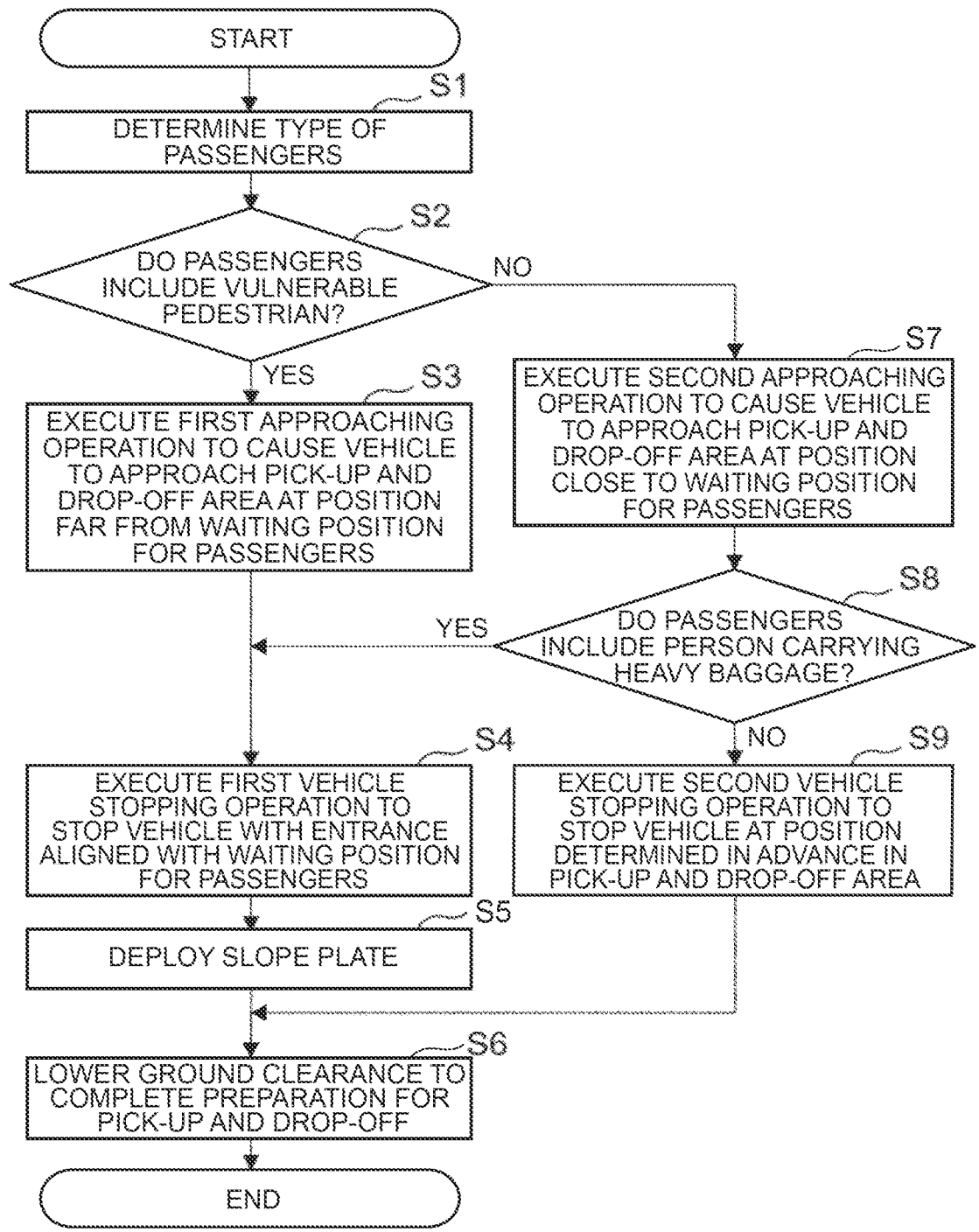
FIG. 8 is a flowchart illustrating an automated drive method according to the embodiment of the present disclosure.

In the present embodiment, automated drive of the vehicle 2 is performed by the automated drive device 10 configured as described above. The behavior of the vehicle 2 described in the foregoing overview is implemented through automated drive of the vehicle 2 performed by the automated drive device 10. An automated drive method by the automated drive device 10 will be described with reference to FIG. 8. FIG. 8 is a flowchart indicating the procedure for the automated drive method by the automated drive device 10.

In the flowchart illustrated in FIG. 8, first, the automated drive device 10 determines the type of the passengers waiting in the waiting area before the vehicle 2 reaches the pick-up and drop-off area 43 (step S1). As discussed earlier, the advance reservation information registered in the advance reservation information DB 12 and the result of the recognition by the object recognition section 14 are used to determine the type of the passengers. Step S1 is an example of the first step of the automated drive method according to the present disclosure. Meanwhile, step S2 and the subsequent steps to be discussed below are an example of the second step of the automated drive method according to the present disclosure.

Next, the automated drive device 10 determines, based on the result of the determination in step S1, whether the passengers include a vulnerable pedestrian (step S2). When the passengers include at least one vulnerable pedestrian, the automated drive device 10 executes the first approaching operation to cause the vehicle 2 to approach the pick-up and drop-off area 43 at a position relatively far from the waiting position for the passengers (step S3). Further, the automated drive device 10 executes the first vehicle stopping operation to stop the vehicle 2 with the entrance 2a aligned with the waiting position for the passengers (step S4). After the vehicle 2 is stopped, the automated drive device 10 deploys the ramp plate 3 (step S5). The automated drive device 10 lowers the ground clearance of the vehicle 2 through the air suspension system after or while deploying the ramp plate 3 (step S6). Preparation for pick-up and drop-off is completed in this manner.

When the passengers do not include any vulnerable pedestrians, the automated drive device 10 executes the second approaching operation to cause the vehicle 2 to approach the pick-up and drop-off area 43 at a position relatively close to the waiting position for the passengers (step S7). Next, the automated drive device 10 determines, based on the result of the determination in step S1, whether the passengers include a person carrying heavy baggage (step S8). When the passengers include at least one person carrying heavy baggage, the automated drive device 10 executes the first vehicle stopping operation to stop the vehicle 2 with the entrance 2a aligned with the waiting position for the passengers (step S4). After the vehicle 2 is stopped, the automated drive device 10 deploys the ramp plate 3 (step S5). The automated drive device 10 lowers the ground clearance of the vehicle through the air suspension system after or while deploying the ramp plate 3 (step S6). Preparation for pick-up and drop-off is completed in this manner.

When the passengers do not include any people carrying heavy baggage, the automated drive device 10 executes the second vehicle stopping operation to stop the vehicle 2 at a position in the pick-up and drop-off area 43 determined in advance (step S9). After the vehicle 2 is stopped, the automated drive device 10 lowers the ground clearance of the vehicle through the air suspension system (step S6). Preparation for pick-up and drop-off is completed in this manner.

With the automated drive method performed by the above procedure, the vehicle can be stopped in the pick-up and drop-off area 43, in which the passengers get on and off the vehicle 2, with movement that matches the feeling of the passengers.

4. Other Embodiments

In the embodiment described above, the first vehicle stopping operation to stop the vehicle 2 with the entrance 2a to the vehicle 2 aligned with the waiting position for the passengers is performed when the type of the passengers is the vulnerable pedestrians or the people carrying heavy baggage. Meanwhile, the second vehicle stopping operation to stop the vehicle 2 at a position determined in advance in the pick-up and drop-off area 43 is performed when the type of the passengers is neither the vulnerable pedestrians nor the people carrying heavy baggage. That is, in the embodiment described above, the vulnerable pedestrians and the people carrying heavy baggage are treated equally regarding the vehicle stopping operations.

However, the vulnerable pedestrians and the people carrying heavy baggage are not considered to completely feel the same way regarding movement of the vehicle 2 during stopping. For the people simply carrying heavy baggage, the annoyance of having to wait until the entrance 2a is aligned with the waiting position may exceed the benefit of aligning the entrance 2a with the waiting position. Hence, in another embodiment of the vehicle stopping operations, the first vehicle stopping operation to stop the vehicle 2 with the entrance 2a to the vehicle 2 aligned with the waiting position for the passengers may be performed only when the type of the passengers is the vulnerable pedestrians. That is, the second vehicle stopping operation to stop the vehicle 2 at a position determined in advance in the pick-up and drop-off area 43 may be performed when the type of the passengers is not the vulnerable pedestrians. Likewise, the operation to deploy the ramp plate 3 may be performed only when the type of the passengers is the vulnerable pedestrians. In some embodiments, the first vehicle stopping operation is performed when a plurality of passengers is waiting in the waiting area and at least one of the passengers is the vulnerable pedestrian.

It is not necessary that all the functions of the automated drive device 10 should be provided in the vehicle 2. For example, in a first modification, the advance reservation information DB 12 may be provided in an external server. In a second modification, the advance reservation information DB 12 and the map route DB 11 may be provided in an external server. In a third modification, all the functions excluding the vehicle control section 17 may be provided in an external server.

What is claimed is:

1. An automated drive device that automatically drives a vehicle along a travel lane, enters the vehicle into a bus bay from the travel lane and stops the vehicle in a pick-up and drop-off area in which a passenger gets on and off the vehicle, the automated drive device comprising:
    at least one processor configured to:
        acquire a type of the passenger before the vehicle reaches the pick-up and drop-off area,
        when the type of the passenger is a vulnerable pedestrian, control the vehicle to enter into the bus bay from the travel lane when the vehicle is a first distance from the pick-up and drop-off area, and
        when the type of the passenger is not a vulnerable pedestrian, control the vehicle to enter into the bus bay from the travel lane when the vehicle is a second distance from the pick-up and drop-off area, the first distance is greater than the second distance, and at least one memory that stores a program and information to be read by the at least one processor.

2. The automated drive device according to claim 1, wherein the at least one processor is configured to, when a plurality of the passengers is waiting at the waiting position and at least one of the passengers is a vulnerable pedestrian, control the vehicle to enter into the bus bay from the travel lane when the vehicle is the first distance from the pick-up and drop-off area.

3. The automated drive device according to claim 1, wherein the at least one processor is configured to:
perform a first vehicle stopping operation to stop the vehicle such that an entrance to the vehicle is aligned with a waiting position for the passenger when the type of the passenger acquired is a vulnerable pedestrian; and
perform a second vehicle stopping operation to stop the vehicle at a position determined in advance in the pick-up and drop-off area in the second process when the type of the passenger acquired in the first process is not a vulnerable pedestrian.

4. The automated drive device according to claim 3, wherein the at least one processor is configured to perform the first vehicle stopping operation when a plurality of the passengers is waiting at the waiting position and at least one of the passengers is a vulnerable pedestrian.

5. The automated drive device according to claim 1, wherein the at least one processor is configured to:
perform a first vehicle stopping operation to stop the vehicle such that an entrance to the vehicle is aligned with a waiting position for the passenger when the type of the passenger acquired is a vulnerable pedestrian or a person carrying heavy baggage; and
perform a second vehicle stopping operation to stop the vehicle at a position determined in advance in the pick-up and drop-off area when the type of the passenger acquired is neither a vulnerable pedestrian nor a person carrying heavy baggage.

6. The automated drive device according to claim 5, wherein the at least one processor is configured to perform the first vehicle stopping operation when a plurality of the passengers is waiting at the waiting position and at least one of the passengers is a vulnerable pedestrian or a person carrying heavy baggage.

7. An automated drive method of automatically driving a vehicle along a travel lane, entering the vehicle into a bus bay from the travel lane, and stopping the vehicle in a pick-up and drop-off area in which a passenger gets on and off the vehicle, the automated drive method comprising:

acquiring, by at least one processor, a type of the passenger before the vehicle reaches the pick-up and drop-off area;
when the type of the passenger is a vulnerable pedestrian, controlling the vehicle, by the at least one processor, to enter into the bus bay from the travel lane when the vehicle is a first distance from the pick-up and drop-off area; and
when the type of the passenger is not a vulnerable pedestrian, controlling the vehicle, by the at least one processor, to enter into the bus bay from the travel lane when the vehicle is a second distance from the pick-up and drop-off area, the first distance is greater than the second distance.

8. The automated drive method according to claim 7, wherein:
when the type of the passenger acquired is a vulnerable pedestrian, a first vehicle stopping operation to stop the vehicle such that an entrance to the vehicle is aligned with a waiting position for the passenger is performed; and
when the type of the passenger acquired is not a vulnerable pedestrian, a second vehicle stopping operation to stop the vehicle at a position determined in advance in the pick-up and drop-off area is performed.

9. The automated drive method according to claim 7, wherein:
when the type of the passenger acquired is a vulnerable pedestrian or a person carrying heavy baggage, a first vehicle stopping operation to stop the vehicle such that an entrance to the vehicle is aligned with a waiting position for the passenger is performed; and
when the type of the passenger acquired is neither a vulnerable pedestrian nor a person carrying heavy baggage, a second vehicle stopping operation to stop the vehicle at a position determined in advance in the pick-up and drop-off area is performed.

10. The automated drive device according to claim 1, wherein the at least one processor is configured to determine whether the passengers include a vulnerable pedestrian.

11. The automated drive method according to claim 7 further comprising determining, by the at least one processor, whether the passengers include a vulnerable pedestrian.

12. The automated drive device according to claim 1, wherein the bus bay is provided on an outer side of the travel lane in which the vehicle travels.

13. The automated drive method according to claim 7, wherein the bus bay is provided on an outer side of the travel lane in which the vehicle travels.

* * * * *